US011132256B2

(12) United States Patent
Roberts

(10) Patent No.: US 11,132,256 B2
(45) Date of Patent: Sep. 28, 2021

(54) RAID STORAGE SYSTEM WITH LOGICAL DATA GROUP REBUILD

(71) Applicant: Western Digital Technologies, Inc., San Jose, CA (US)

(72) Inventor: Adam Roberts, Moncure, NC (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/054,217

(22) Filed: Aug. 3, 2018

(65) Prior Publication Data

US 2020/0042388 A1    Feb. 6, 2020

(51) Int. Cl.
*G06F 11/00* (2006.01)
*G06F 11/10* (2006.01)
*G06F 11/20* (2006.01)

(52) U.S. Cl.
CPC ...... *G06F 11/1092* (2013.01); *G06F 11/1088* (2013.01); *G06F 11/2094* (2013.01); *G06F 2211/1035* (2013.01)

(58) Field of Classification Search
CPC .... G06F 11/1092; G06F 3/0619; G06F 3/064; G06F 11/1088; G06F 3/0614; G06F 11/07; G06F 11/0793; G06F 11/16; G06F 2211/104; G06F 2212/1032; G06F 2212/7201; G06F 11/2094; G06F 2211/1035

See application file for complete search history.

(56) References Cited

U.S. PATENT DOCUMENTS

| | | |
|---|---|---|
| 5,790,773 A | 8/1998 | DeKoning et al. |
| 7,281,160 B2 | 10/2007 | Stewart |
| 7,849,356 B2 | 12/2010 | Jones et al. |
| 7,984,325 B2 | 7/2011 | Fukutomi et al. |
| 8,015,440 B2 | 9/2011 | Flynn et al. |
| 8,726,070 B2 | 5/2014 | Nelogal et al. |
| 8,751,862 B2 | 6/2014 | Cherian et al. |
| 8,984,371 B2 | 3/2015 | Gladwin et al. |
| 9,325,790 B1 * | 4/2016 | Le ........................... H04L 63/10 |
| 9,396,205 B1 | 7/2016 | Lewis et al. |
| 9,454,433 B2 | 9/2016 | Dennett et al. |
| 9,542,272 B2 | 1/2017 | Krishnamurthy et al. |
| 9,715,431 B2 * | 7/2017 | Chadwell ............ G06F 11/1092 |
| 9,990,263 B1 * | 6/2018 | Tian .................... G06F 11/1092 |

(Continued)

*Primary Examiner* — Loan L. T. Truong
(74) *Attorney, Agent, or Firm* — Patent Law Works LLP

(57) ABSTRACT

Example redundant array of independent disks (RAID) storage systems and methods provide rebuild of logical data groups. Storage devices are configured as a storage array for storing logical data groups distributed among the storage devices. The logical data groups are written in a configuration of RAID stripes in the storage devices. A failed storage device may be rebuilt using the RAID stripes and completed rebuilds of logical blocks may be tracked during the device rebuild process. A logical group rebuild status may be determined by comparing the completed rebuilds of logical blocks to a logical group map. The logical group rebuild status for each logical data group may be provided as complete in response to all logical blocks in the logical data group having been rebuilt. In the event the array rebuild fails, the logical groups that did complete rebuild may be brought online as a partially completed rebuild to prevent the loss of the entire array.

20 Claims, 8 Drawing Sheets

(56) References Cited

U.S. PATENT DOCUMENTS

| | | | |
|---|---|---|---|
| 10,268,449 B1* | 4/2019 | Wang | G06F 7/24 |
| 10,496,330 B1* | 12/2019 | Bernat | G06F 3/064 |
| 10,540,109 B2* | 1/2020 | Ray | G06F 3/067 |
| 10,545,687 B1* | 1/2020 | Bernat | G06F 3/0659 |
| 2005/0102552 A1 | 5/2005 | Horn | |
| 2009/0044043 A1 | 2/2009 | Cherian et al. | |
| 2009/0150641 A1* | 6/2009 | Flynn | G06F 12/1018 |
| | | | 711/202 |
| 2009/0271659 A1 | 10/2009 | Troppens et al. | |
| 2010/0031000 A1* | 2/2010 | Flynn | G06F 16/9014 |
| | | | 711/216 |
| 2011/0126045 A1 | 5/2011 | Bennett | |
| 2012/0079190 A1* | 3/2012 | Colgrove | G06F 3/0689 |
| | | | 711/114 |
| 2012/0079317 A1* | 3/2012 | Nelogal | G06F 11/1092 |
| | | | 714/6.22 |
| 2013/0024723 A1 | 1/2013 | Govindasamy | |
| 2013/0047028 A1* | 2/2013 | Daikokuya | G06F 11/0727 |
| | | | 714/6.3 |
| 2013/0054907 A1* | 2/2013 | Ikeuchi | G06F 11/1092 |
| | | | 711/159 |
| 2013/0054913 A1* | 2/2013 | Maeda | G06F 9/50 |
| | | | 711/162 |
| 2013/0238928 A1* | 9/2013 | Watanabe | G06F 11/1092 |
| | | | 714/6.21 |
| 2014/0281689 A1* | 9/2014 | Fischer | G06F 11/1092 |
| | | | 714/6.22 |
| 2014/0325262 A1 | 10/2014 | Cooper et al. | |
| 2014/0337666 A1 | 11/2014 | Resch et al. | |
| 2014/0365819 A1* | 12/2014 | Cooper | G06F 11/1092 |
| | | | 714/6.22 |
| 2015/0301895 A1 | 10/2015 | Dennett et al. | |
| 2016/0034370 A1* | 2/2016 | Nanduri | G06F 3/0689 |
| | | | 714/6.22 |
| 2016/0110264 A1* | 4/2016 | Mehta | H04L 67/1097 |
| | | | 707/679 |
| 2016/0342470 A1* | 11/2016 | Cudak | G06F 3/0619 |
| 2016/0378339 A1* | 12/2016 | Andre | G06F 3/061 |
| | | | 711/114 |
| 2017/0091052 A1* | 3/2017 | Gao | G06F 11/1076 |
| 2017/0185312 A1* | 6/2017 | Smith | G06F 3/0689 |
| 2017/0242745 A1* | 8/2017 | Sherlock | G06F 11/0727 |
| 2017/0270018 A1* | 9/2017 | Xiao | G06F 3/0617 |
| 2018/0024885 A1* | 1/2018 | Baptist | G06F 3/0619 |
| | | | 714/764 |
| 2018/0101456 A1* | 4/2018 | Critchley | G06F 11/1076 |
| 2018/0152204 A1* | 5/2018 | Halbawi | H03M 13/3761 |
| 2018/0300212 A1* | 10/2018 | Gong | G06F 11/1076 |
| 2018/0314531 A1* | 11/2018 | Rhodes | G06F 9/4492 |
| 2019/0012236 A1* | 1/2019 | Hitron | G06F 11/1076 |
| 2019/0129614 A1* | 5/2019 | Dalmatov | G06F 3/0619 |
| 2019/0163587 A1* | 5/2019 | Anna | G06F 11/2056 |
| 2019/0179706 A1* | 6/2019 | Bono | G06F 11/1076 |
| 2019/0205053 A1* | 7/2019 | Nomura | G06F 3/0689 |
| 2019/0303243 A1* | 10/2019 | Lee | G06F 11/1088 |
| 2020/0042215 A1 | 2/2020 | Roberts | |
| 2020/0042388 A1 | 2/2020 | Roberts | |
| 2020/0043524 A1* | 2/2020 | Roberts | G06F 3/06 |

* cited by examiner

RAID STORAGE SYSTEM WITH LOGICAL DATA GROUP REBUILD

TECHNICAL FIELD

The present disclosure generally relates to data storage, and in a more particular example, to redundant array of independent disks (RAID) storage and rebuild.

BACKGROUND

Often, distributed storage systems are used to store large amounts (e.g., terabytes, petabytes, exabytes, etc.) of data, such as objects or files in a distributed and fault tolerant manner with a predetermined level of redundancy.

Some existing object storage systems store data objects referenced by an object identifier versus file systems. This can generally allow object storage systems to surpass the maximum limits for storage capacity of file systems in a flexible way such that, for example, storage capacity can be added or removed as a function of the applications, systems, and/or enterprise needs, while reducing degradation in performance as the system grows. As a result, object storage systems are often selected for large-scale storage systems.

Groups of objects may be further organized into logical data groups called containers or buckets. Definition of these buckets may be determined by a combination of a host organization's implementation and data owner configuration, generally based on data ownership/access, application relationships, data service contracts/terms, and/or other considerations. In other configurations, including those using file system storage, logical data groups may be implemented across data stores as namespaces and, more specifically, global namespaces.

Such large-scale storage systems generally distribute the stored data objects in the object storage system over multiple storage elements, such as for example disk drives (solid-state drives, hard disk drives, hybrid drives, tape drives, etc.), or multiple components such as storage nodes comprising a plurality of such storage elements. However, as the number of storage elements in such a distributed object storage system increase, equally the probability of failure of one or more of these storage elements increases. To cope with this issue, distributed object storage system generally use some level of redundancy, which allows the system to cope with a failure of one or more storage elements without data loss. For example, such storage systems may use some combination of object replication and RAID configurations within and across storage nodes.

Some storage systems may be arranged in an array of drives interconnected by a common communication fabric and, in many cases, controlled by a storage controller, RAID controller, or general controller, for coordinating storage and system activities across the array of drives. The data stored in the array may be stored according to a defined RAID level, a combination of RAID schemas, or other configurations for providing desired data redundancy, performance, and capacity utilization. In general, these data storage configurations may involve some combination of redundant copies (mirroring), data striping, and/or parity (calculation and storage), and may incorporate other data management, error correction, and data recovery processes, sometimes specific to the type of disk drives being used (e.g., solid-state drives versus hard disk drives). After a drive has failed, the RAID configuration may support a rebuild process to a replacement drive, such as a hot spare, or across existing drives with unused capacity.

The RAID rebuild process may proceed across RAID stripes that include data units on the failed drive (along with data units and/or parity information stored on the remaining drives). The order of the RAID rebuild may be based on the arrangement of RAID stripes and the rebuild process may attempt to rebuild the entire failed drive before returning the array and/or the drive to read/write operation. However, RAID rebuild will sometimes fail before all RAID stripes are rebuilt.

A need exists for at least improved rebuild of failed storage devices to enable improved recovery of logical data groups. For example, when rebuilding a RAID array containing logical data groups, a need exists to recover and use logical data groups without requiring a full RAID rebuild.

SUMMARY

Various aspects for RAID data rebuild and use involving logical data groups in RAID storage systems are described. In an innovative aspect, a storage system comprises a plurality of storage devices configured as a storage array for storing a plurality of logical data groups distributed among the plurality of storage devices. A redundant array of independent disks (RAID) controller is configured to write the plurality of logical data groups in a configuration of RAID stripes across at least one RAID group in the plurality of storage devices. The RAID controller comprises a rebuild module configured to rebuild a failed storage device from the plurality of storage devices based on the configuration of RAID stripes. A rebuild progress monitor is configured to track completed rebuilds of logical blocks from the failed storage device during a device rebuild process. A logical group index comprises a logical group map for each of the plurality of logical data groups. The logical group map identifies the logical blocks corresponding to each of the plurality of logical data groups. A logical group rebuild module is configured to determine a logical group rebuild status by comparing the completed rebuilds of logical blocks from the rebuild progress manager to at least one logical group map in the logical group index, and provides a logical group rebuild status as complete in response to at least one logical data group having been rebuilt.

In various embodiments, where the device rebuild process fails before the failed storage device rebuild is complete and the logical group rebuild status is complete for at least one logical data group, the storage system may further comprise a storage access controller configured to enable the at least one logical data group with the logical group rebuild status of complete to be used for production read/write operations. The storage access controller may be further configured to redefine the storage array to exclude any logical data groups that do not have the logical group rebuild status of complete in response to the device rebuild process failing. Each of the plurality of logical data groups may have an allocated storage capacity, and redefining the storage array to exclude any logical data groups that do not have the logical group rebuild status of complete may include redefining a total capacity of the storage array. The redefined capacity may be at least a sum of the allocated storage capacity of each of the plurality of logical data groups that have the logical group rebuild status of complete and less than a total original capacity of the storage array before the failed storage device failed. The storage access controller may be further configured to determine a risk status in response to a partial rebuild of the failed storage device.

In some embodiments, the rebuild module may further comprises a rebuild queue defining a rebuild order for the logical blocks of the failed storage device. The rebuild order may proceed through the configuration of RAID stripes without reference to the plurality of logical data group.

In various embodiments, the plurality of logical data groups may include a first logical data group and a second logical data group. The storage system may further comprise a storage access controller configured to enable the first logical data group to be used for production read/write operations in response to the logical group rebuild status for the first logical data group becoming complete at a first rebuild time. The storage access controller may be configured to enable the second logical data group to be used for production read/write operations in response to the logical group rebuild status for the second logical data group becoming complete at a second rebuild time that is different from the first rebuild time.

In another innovative aspect, a computer-implemented method provides rebuild of logical data groups. A logical group index is accessed for a plurality of storage devices configured as a storage array for storing a plurality of logical data groups distributed among the plurality of storage devices. The logical group index comprises a logical group map for each of the plurality of logical data groups, and the logical group map identifies logical blocks corresponding to each of the plurality of logical data groups. The plurality of logical data groups are written in a configuration of redundant array of independent disks (RAID) stripes across at least one RAID group in the plurality of storage devices. In response to a failed storage device failing among the plurality of storage devices, a replacement storage device is identified for rebuilding the failed storage device. The failed storage device is rebuilt to the replacement storage device based on the configuration of RAID stripes. Completed rebuilds of logical blocks from the failed storage device are tracked during a device rebuild process. The completed rebuilds of logical blocks are compared to at least one logical group map in the logical group index during the device rebuild process. A logical group rebuild status is set to complete for at least one logical data group in response to all logical blocks in the at least one logical data group having been rebuilt in the device rebuild process.

In various embodiments, the device rebuild process may fail before the failed storage device rebuild is complete and after the logical group rebuild status is complete for at least one logical data group. The at least one logical data group with the logical group rebuild status of complete may be enabled to be used for production read/write operations. Read/write operations may be executed to the at least logical data group with the logical group rebuild status of complete. The storage array may be redefined to exclude any logical data groups that do not have the logical group rebuild status of complete in response to failing the device rebuild process. Each of the plurality of logical data groups may have an allocated storage capacity. Redefining the storage array to exclude any logical data groups that do not have the logical group rebuild status of complete may include redefining a total capacity of the storage array. The redefined capacity may be at least a sum of the allocated storage capacity of each of the plurality of logical data groups that have the logical group rebuild status of complete, and less than a total original capacity of the storage array before the failed storage device failed. A risk status may be determined in response to a partial rebuild of the failed storage device.

In some embodiments, the device rebuild process comprises selecting a rebuild order for the logical blocks of the failed storage device. The device rebuild order may be based on the configuration of RAID stripes without reference to the plurality of logical data groups. The logical blocks of the failed storage device may be rebuilt in the rebuild order.

In various embodiments, the plurality of logical data groups may include a first logical data group and a second logical data group. The first logical data group may be enabled to be used for production read/write operations in response to setting a first logical group rebuild status for the first logical data group to complete at a first rebuild time. The second logical data group may be enabled to be used for production read/write operations in response to setting a second logical group rebuild status for the second logical data group becoming complete at a second rebuild time that is different from the first rebuild time.

In yet another innovative aspect, a system provides rebuild of logical data groups. Means are provided for accessing a logical group index for a plurality of storage devices configured as a storage array for storing a plurality of logical data groups distributed among the plurality of storage devices. The logical group index comprises a logical group map for each of the plurality of logical data groups. The logical group map identifies logical blocks corresponding to each of the plurality of logical data groups. Means are provided for writing the plurality of logical data groups in a configuration of redundant array of independent disks (RAID) stripes across at least one RAID group in the plurality of storage devices. Means are provided for identifying a replacement storage device for rebuilding a failed storage device. Means are provided for rebuilding the failed storage device to the replacement storage device based on the configuration of RAID stripes. Means are provided for tracking completed rebuilds of logical blocks from the failed storage device during a device rebuild process. Means are provided for comparing the completed rebuilds of logical blocks to at least one logical group map in the logical group index during the device rebuild process. Means are provided for setting a logical group rebuild status to complete for at least one logical data group in response to all logical blocks in the at least one logical data group having been rebuilt in the device rebuild process.

In various embodiments, the device rebuild process may fail before the failed storage device rebuild is complete and after the logical group rebuild status is complete for at least one logical data group. Means may be provided for enabling the at least one logical data group with the logical group rebuild status of complete to be used for production read/write operations. Means may be provided for executing read/write operations to the at least logical data group with the logical group rebuild status of complete. Means may be provided for redefining the storage array to exclude any logical data groups that do not have the logical group rebuild status of complete in response to failing the device rebuild process. Means may be provided for determining a risk status in response to a partial rebuild of the failed storage device.

In some embodiments, means may be provided for selecting a rebuild order for the logical blocks of the failed storage device based on the configuration of RAID stripes and without reference to the plurality of logical data groups. The means for rebuilding the logical blocks of the failed storage device may use the rebuild order.

In various embodiments, the plurality of logical data groups may include a first logical data group and a second logical data group. Means may be provided for enabling the first logical data group to be used for production read/write operations in response to setting a first logical group rebuild status for the first logical data group to complete at a first rebuild time. Means may be provided for enabling the second logical data group to be used for production read/write operations in response to setting a second logical group rebuild status for the second logical data group becoming complete at a second rebuild time that is different from the first rebuild time.

The various embodiments advantageously apply the teachings of RAID storage networks and/or systems to improve the functionality of such computer systems. The various embodiments include operations to overcome or at least reduce the issues in the previous storage networks and/or systems discussed above and, accordingly, are more robust than other computing networks. That is, the various embodiments disclosed herein include hardware and/or software with functionality to improve the recovery of logical data groups, based on monitoring RAID rebuilds for the completion of logical data groups. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
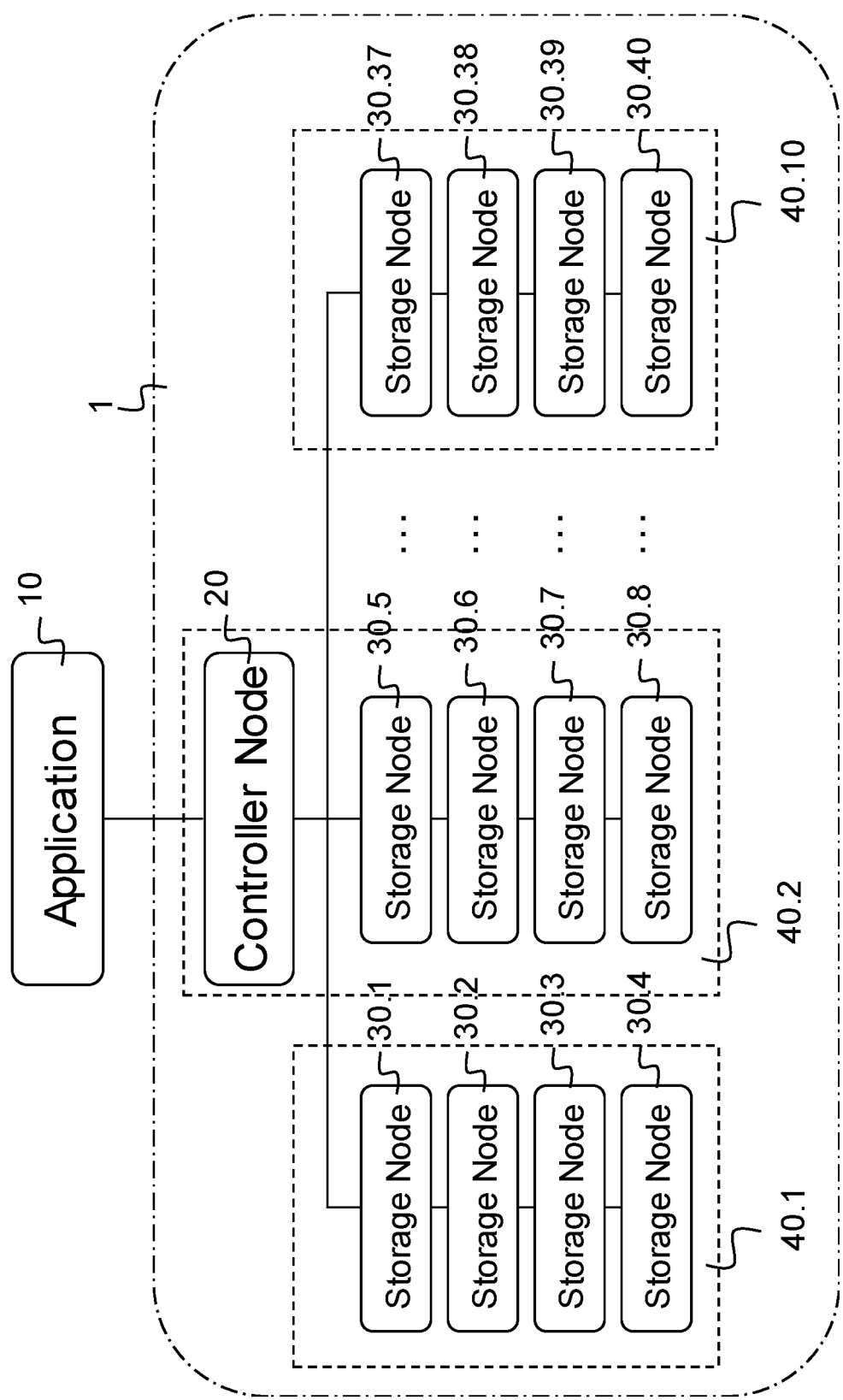
FIG. 1 schematically illustrates an example embodiment of a storage system.

FIG. 1 shows an embodiment of an example storage system 1, such as a storage system implementing one or more RAID configurations. According to this embodiment, the storage system 1 may be implemented as an object storage system which is coupled to an application 10 for transferring data objects. The connection between the storage system 1 and the application 10 could, for example, be implemented as a suitable data communication network. Such an application 10 could, for example, be a dedicated software application running on a computing device, such as a personal computer, a laptop, a wireless telephone, a personal digital assistant or any other type of communication device that is able to interface directly with the storage system 1. However, according to alternative embodiments, the application 10 could for example comprise a suitable file system which enables a general purpose software application to interface with the storage system 1, an application programming interface (API) library for the storage system 1, etc.

As further shown in FIG. 1, the storage system 1 comprises a controller node 20 and a plurality of storage nodes 30.1-30.40 which may be coupled in a suitable way for transferring data, for example by means of a conventional data communication network such as a local area network (LAN), a wide area network (WAN), a telephone network, such as the public switched telephone network (PSTN), an intranet, the internet, or any other suitable communication network or combination of communication networks. Controller node 20, storage nodes 30 and the device comprising application 10 may connect to the data communication network by means of suitable wired, wireless, optical, etc. network connections or any suitable combination of such network connections. Although the embodiment of FIG. 1 shows only a single controller node 20 and forty storage nodes 30, according to alternative embodiments the storage system 1 could comprise any other suitable number of storage nodes 30 and, for example, two, three or more controller nodes 20 coupled to these storage nodes 30.

These controller nodes 20 and storage nodes 30 can be built as general-purpose computers, however more frequently they are physically adapted for arrangement in large data centers, where they are arranged in modular racks 40 comprising standard dimensions. Exemplary controller nodes 20 and storage nodes 30 may be dimensioned to take up a single unit of such rack 40, which is generally referred to as 1U. Such an exemplary storage node may use a low-power processor and may be equipped with ten or twelve high capacity serial advanced technology attachment (SATA) disk drives and is connectable to the network over redundant Ethernet network interfaces. An exemplary controller node 20 may comprise high-performance servers and provide network access to applications 10 over multiple high bandwidth Ethernet network interfaces. Data can be transferred between applications 10 and such a controller node 20 by means of a variety of network protocols including hypertext transfer protocol (HTTP)/representational state transfer (REST) object interfaces, language-specific interfaces such as Microsoft .Net, Python or C, etc. Additionally, such controller nodes may comprise additional high bandwidth Ethernet ports to interface with the storage nodes 30. In some embodiments, HTTP/REST protocols complying with S3 may enable data transfer through a REST application protocol interfaces (API). Preferably, such controller nodes 20 operate as a highly available cluster of controller nodes, and provide for example shared access to the storage nodes 30, metadata caching, protection of metadata, etc.

As shown in FIG. 1 several storage nodes 30 can be grouped together, for example because they are housed in a single rack 40. For example, storage nodes 30.1-30.4; 30.5-30.8; . . . ; and 30.7-30.40 each are respectively grouped into racks 40.1, 40.2, . . . 40.10. Controller node 20 could for example be located in rack 40.2. These racks are not required to be located at the same location, they are often geographically dispersed across different data centers, such as for example rack 40.1-40.3 can be located at a data center in Europe, 40.4-40.7 at a data center in the USA and 40.8-40.10 at a data center in China.

Figure 2:
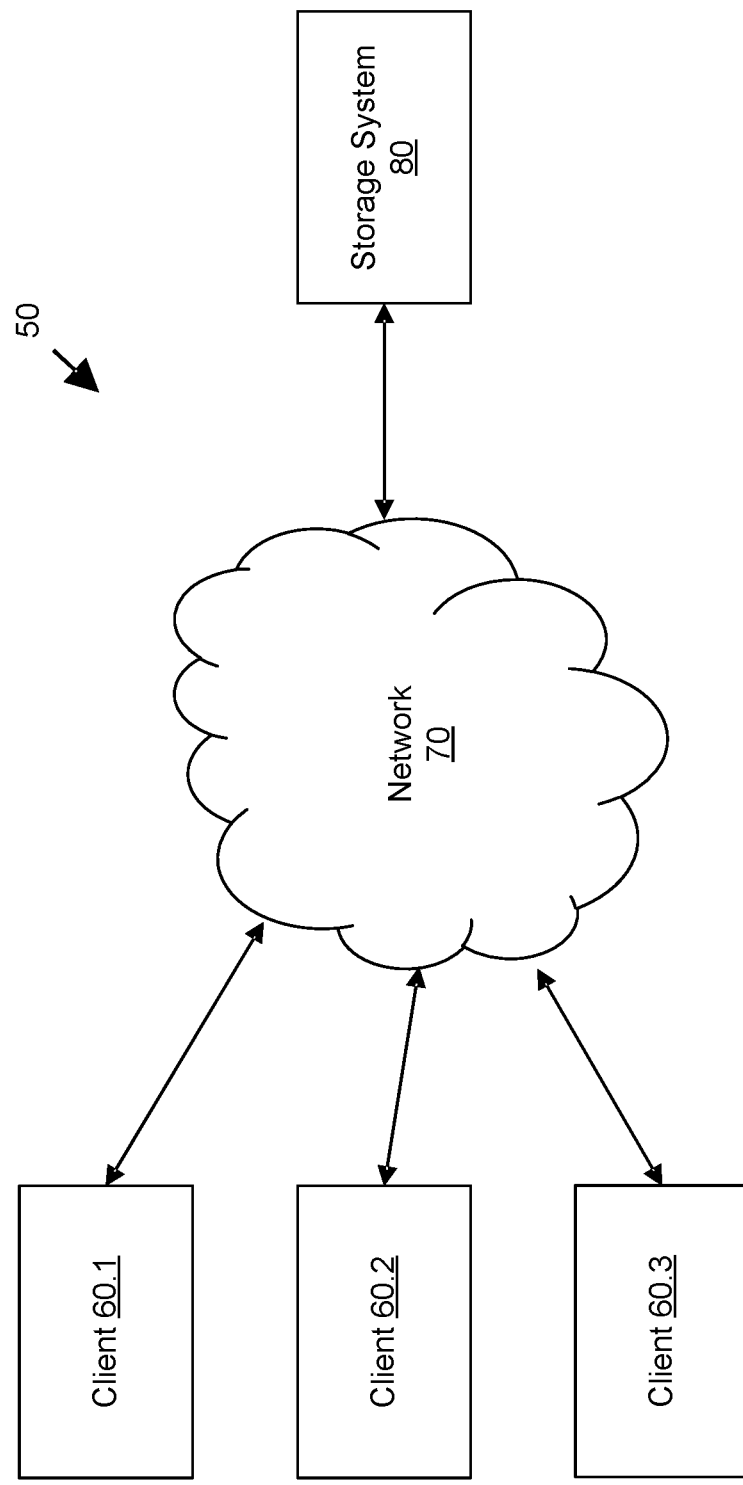
FIG. 2 schematically illustrates an example client architecture in which some embodiments of the storage system of FIG. 1 may operate.

FIG. 2 is a block diagram of an example storage network 50 using a client architecture. In some embodiments, distributed storage system 1 may be embodied in such a storage network 50. As shown, storage network 50 can include multiple client devices 60 capable of being coupled to and in communication with a storage network 50 via a wired and/or wireless network 70 (e.g., public and/or private computer networks in any number and/or configuration (e.g., the Internet, an intranet, a cloud network, etc.)), among other examples that may include one client device 60.1 or two or more client devices 60 (e.g., is not limited to three client devices 60.1-60.3).

A client device 60 can be any computing hardware and/or software (e.g., a thick client, a thin client, or hybrid thereof) capable of accessing storage system 80 utilizing network 70. Each client device 60, as part of its respective operation, relies on sending input/output (I/O) requests to storage system 80 to write data, read data, and/or modify data. Specifically, each client device 60 can transmit I/O requests to read, write, store, communicate, propagate, and/or transport instructions, data, computer programs, software, code, routines, etc., to storage system 80. Client device(s) 60 and storage system 80 may comprise at least a portion of a client-server model. In general, storage system 80 can be accessed by client device(s) 60 and/or communication with storage system 80 can be initiated by client device(s) 60 through a network socket (not shown) utilizing one or more inter-process networking techniques. In some embodiments, client devices 60 may access one or more applications, such as application 10 in FIG. 1, to use or manage a distributed storage system, such as storage system 1 in FIG. 1.

Figure 3:
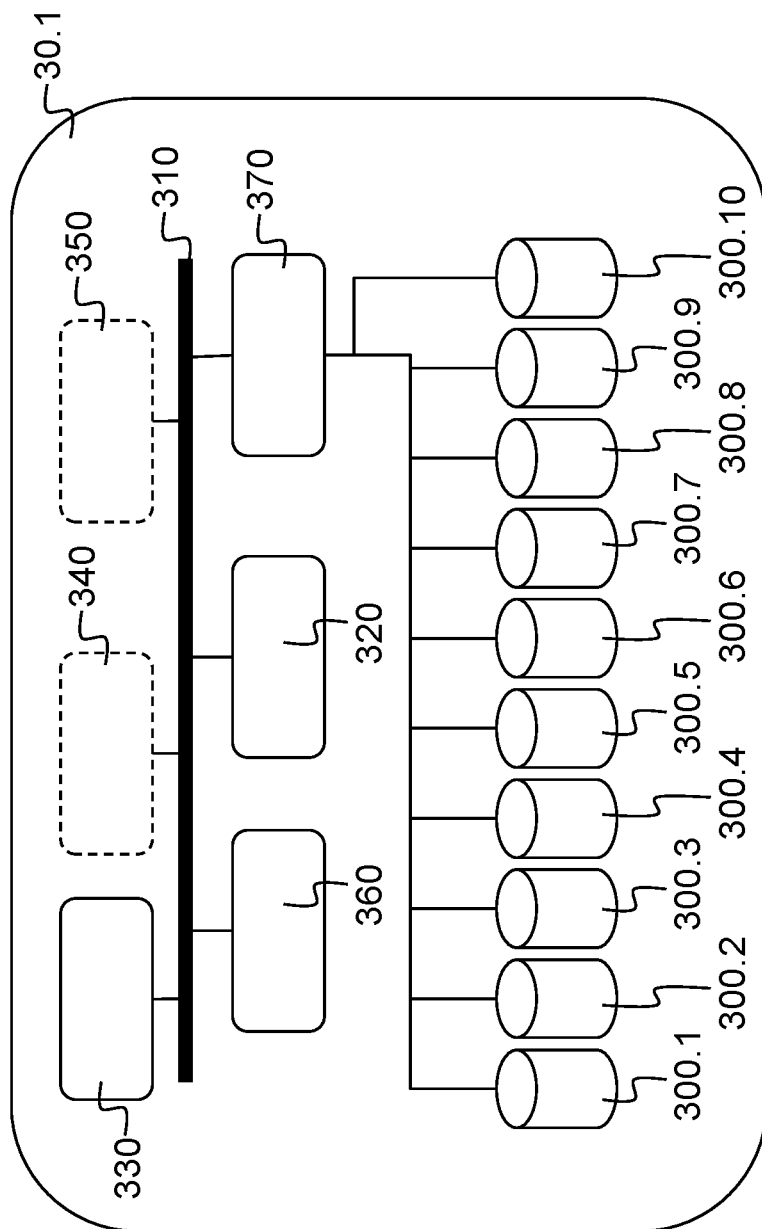
FIG. 3 schematically illustrates an example embodiment of a storage node of the storage system of FIG. 1.

FIG. 3 shows a schematic representation of an embodiment of one of the storage nodes 30. Storage node 30.1 may comprise a bus 310, a processor 320, a local memory 330, one or more optional input units 340, one or more optional output units 350, a communication interface 360, a storage element interface 370, and two or more storage elements 300.1-300.10. Bus 310 may include one or more conductors that permit communication among the components of storage node 30.1. Processor 320 may include any type of conventional processor or microprocessor that interprets and executes instructions. Local memory 330 may include a random access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to the storage node 30.1, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 30.1 to communicate with other devices and/or systems, for example mechanisms for communicating with other storage nodes 30 or controller nodes 20 such as for example two 1 Gb Ethernet interfaces.

Storage element interface 370 may comprise a storage interface such as for example a SATA interface or a small computer system interface (SCSI) for connecting bus 310 to one or more storage elements 300, such as one or more local disks, for example 3 terabyte (TB) SATA disk drives, and control the reading and writing of data to/from these storage elements 300. In one exemplary embodiment as shown in FIG. 3, such a storage node 30.1 could comprise ten or twelve 3 TB SATA disk drives as storage elements 300.1-300.10 and in this way storage node 30.1 would provide a storage capacity of 30 TB or 36 TB to the storage system 1. According to the exemplary embodiment of FIG. 1 and in the event that storage nodes 30.2-30.40 are identical to storage node 30.1 and each comprise a storage capacity of 36 TB, the storage system 1 would then have a total storage capacity of 1440 TB.

As is clear from FIGS. 1 and 3 the storage system 1 comprises a plurality of storage elements 300. As will be described in further detail below, the storage elements 300, could also be referred to as redundant storage elements 300 as the data is stored on these storage elements 300 such that none or a specific portion of the individual storage elements 300 on its own is critical for the functioning of the storage system. Each of the storage nodes 30 may comprise a share of these storage elements 300. These storage elements 300 may provide redundant storage in one or more RAID configurations. For example, the ten storage elements 300 in storage node 30.1 may be configured as a storage array implementing a RAID group across the ten storage devices.

As shown in FIG. 1 storage node 30.1 comprises ten storage elements 300.1-300.10. Other storage nodes 30 could comprise a similar amount of storage elements 300, but this is, however, not essential. Storage node 30.2 could, for example, comprise six storage elements 300.11-300.16, and storage node 30.3 could, for example, comprise four storage elements 300.17-300.20. In some embodiments, the storage system 1 may be operable as an object storage system to store and retrieve a data object comprising data (e.g. 64 megabytes (MB) of binary data) and a data object identifier for addressing this data object, for example, a universally unique identifier such as a globally unique identifier (GUID). Storing the data offered for storage by the application 10 in the form of a data object, also referred to as object storage, may have specific advantages over other storage schemes such as conventional block-based storage or conventional file-based storage.

The storage elements 300 or a portion thereof may be redundant and operate independently of one another. This means that if one particular storage element 300 fails its function it can easily be taken on by another storage element 300 in the storage system 1. The storage elements 300 may be capable of providing redundancy without having to work in synchronism, as is for example the case in some RAID configurations, which sometimes even require disc spindle rotation to be synchronized. Furthermore, the independent and redundant operation of the storage elements 300 may allow a suitable mix of types of storage elements 300 to be used in a particular storage system 1. It is possible to use for example storage elements 300 with differing storage capacity, storage elements 300 of differing manufacturers, using different hardware technology such as for example conventional hard disks and solid state storage elements, using different storage interfaces such as for example different revisions of SATA, parallel advanced technology attachment (PATA), and so on. This may result in advantages relating to scalability and flexibility of the storage system 1 as it allows for adding or removing storage elements 300 without imposing specific requirements to their design in correlation to other storage elements 300 already in use in the storage system 1.

Figure 4:
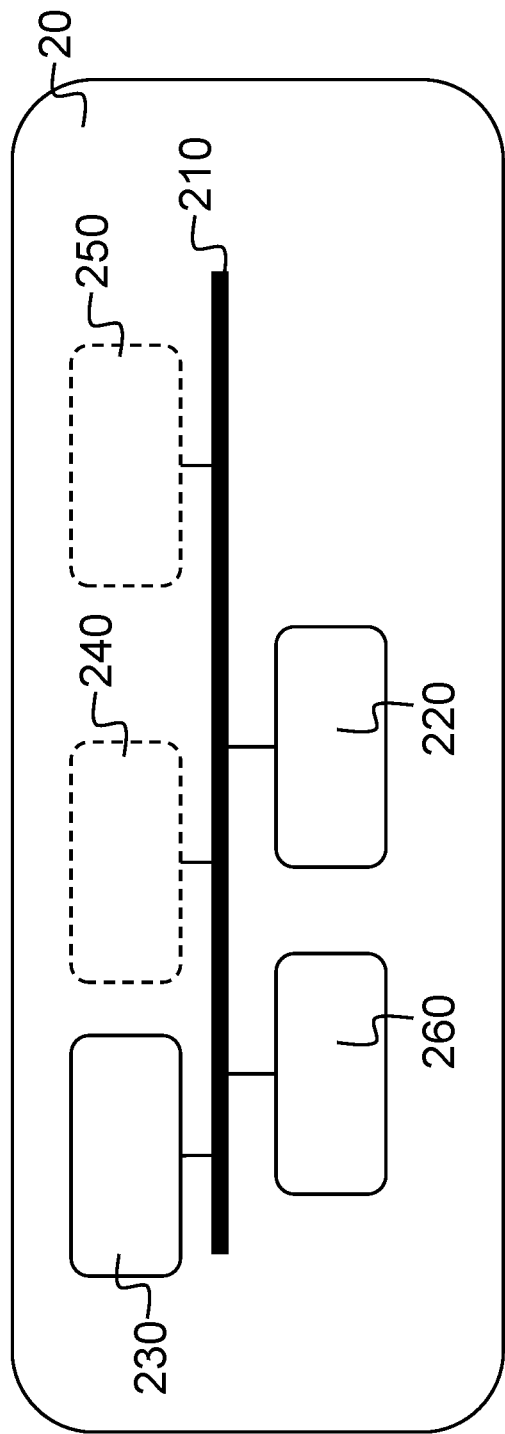
FIG. 4 schematically illustrates an example embodiment of a controller node of the storage system of FIG. 1.

FIG. 4 shows a schematic representation of an embodiment of the controller node 20. Controller node 20 may comprise a bus 210, a processor 220, a local memory 230, one or more optional input units 240, one or more optional output units 250. Bus 210 may include one or more conductors that permit communication among the components of controller node 20. Processor 220 may include any type of conventional processor or microprocessor that interprets and executes instructions. Local memory 230 may include a random access memory (RAM) or another type of dynamic storage device that stores information and instructions for execution by processor 220 and/or a read only memory (ROM) or another type of static storage device that stores static information and instructions for use by processor 320 and/or any suitable storage element such as a hard disc or a solid state storage element. An optional input unit 240 may include one or more conventional mechanisms that permit an operator to input information to the controller node 20 such as a keyboard, a mouse, a pen, voice recognition and/or biometric mechanisms, etc. Optional output unit 250 may include one or more conventional mechanisms that output information to the operator, such as a display, a printer, a speaker, etc. Communication interface 260 may include any transceiver-like mechanism that enables controller node 20 to communicate with other devices and/or systems, for example mechanisms for communicating with other storage nodes 30 or controller nodes 20 such as for example two 10 Gb Ethernet interfaces.

According to an alternative embodiment, the controller node 20 could have an identical design as a storage node 30, or according to still a further alternative embodiment one of the storage nodes 30 of the storage system could perform both the function of a controller node 20 and a storage node 30. According to still further embodiments, the components of the controller node 20 as described in more detail below could be distributed amongst a plurality of controller nodes 20 and/or storage nodes 30 in any suitable way. According to still a further embodiment, the device on which the application 10 runs is a controller node 20.

Figure 5:
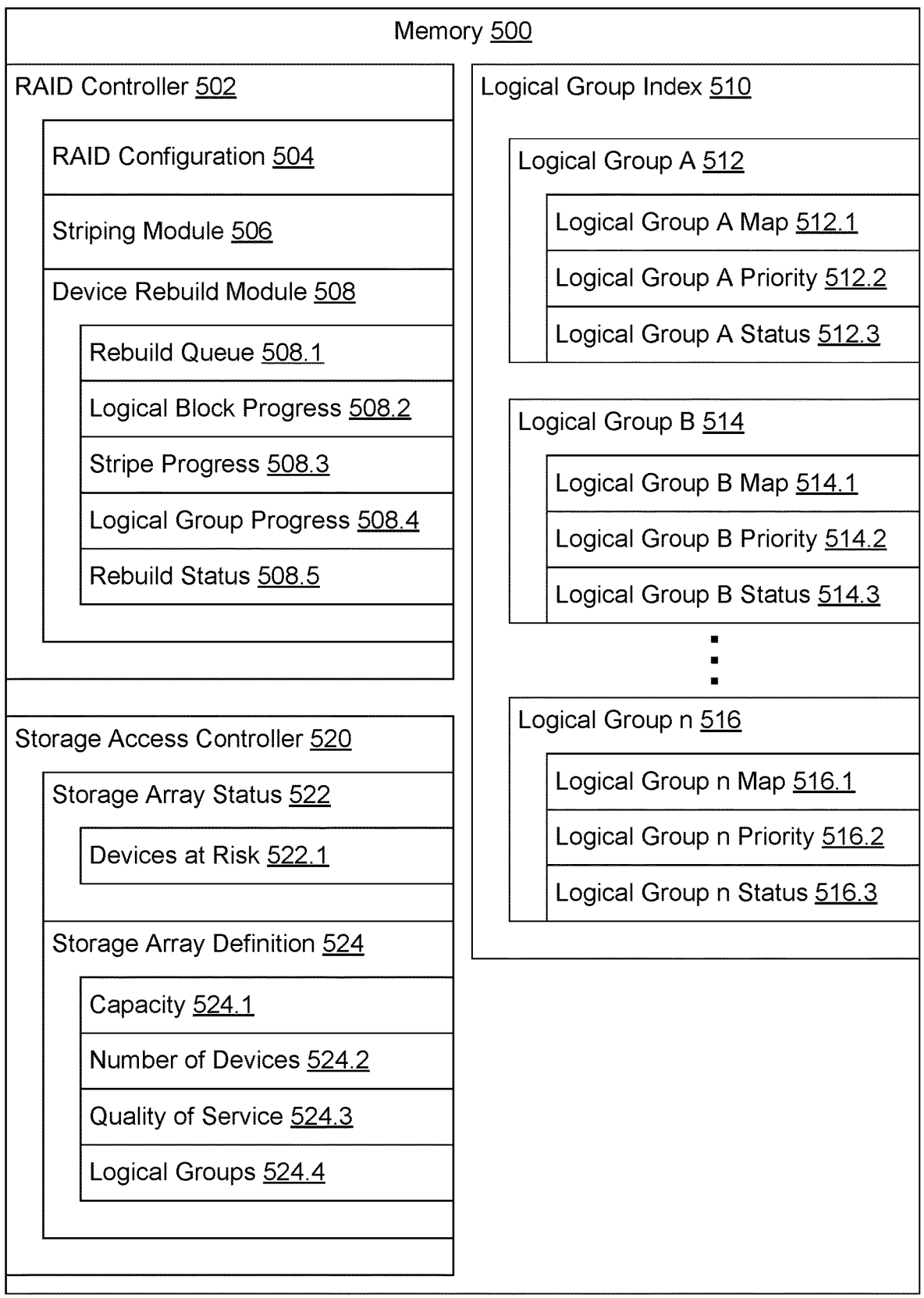
FIG. 5 schematically illustrates some example components of a memory for RAID rebuild with logical data groups, such as may operate in one or more nodes of the storage system of FIG. 1.

FIG. 5 schematically shows a memory 500 that may be implemented in one or more nodes of a storage system, such as those shown in FIGS. 1-4. Memory 500 includes components for using RAID to store and rebuild logical data groups. In some embodiments, memory 500 may be included in one or more of storage nodes 30 and/or controller node 20 to implement RAID in some or all of storage elements 300. Memory 500 may be instantiated in memory 230 of controller node 20 or memory 330 of storage nodes 30 and executed by processor 220 or processor 320. In some embodiments, memory 500 may be implemented in a separate RAID controller node (not shown) configured similarly to controller node 20.

In some embodiments, memory 500 may include a RAID controller 502, a logical group index 510, and a storage access controller 520. Each of these subsystems may be included in a single node or may be distributed across multiple nodes and/or executed by separate processors.

RAID controller 502 may be configured to rebuild a failed storage device in response to a storage device failure. For example, RAID controller 502 may be a hardware or software RAID controller for implementing at least one RAID group among two or more storage devices, such as disk drives in a storage array. RAID controller 502 may organize a group of physical storage devices into a plurality of logical recovery units distributed among the storage devices, such as RAID stripes. For example, a data unit, such as a block, may be divided among a number of the storage devices in the RAID group to define a RAID stripe. In some embodiments, parity data may also be calculated and stored in at least one of the storage devices as part of the stripe. In some embodiments, RAID units may be mirrored for increased resiliency.

RAID controller 502 may include a RAID configuration 504. For example, RAID configuration 504 may identify the RAID-level, storage devices in the RAID group, RAID stripe allocation and depth, parity and/or mirroring processes, and/or specific algorithms for implementing these or other RAID-related features. In some embodiments, RAID configuration 504 may identify a set of storage devices (or portions of storage devices) in which to implement a RAID group. For example, RAID configuration 504 may include a list of storage device identifiers designated in a particular RAID group and the RAID logic to be used for writing to and rebuilding storage devices in the RAID group.

In some embodiments, RAID controller 502 may be responsible for allocation of write commands and/or parity storage to implement RAID configuration 504. In some embodiments, the RAID configuration may be implemented by a separate RAID process in the write channel for the storage elements. For example, RAID configuration 504 may be a description of a RAID process and parameters implemented in a selected RAID group by another RAID controller or integrated RAID process and RAID controller 502 may be used only for a rebuild process.

RAID controller 502 may include striping module 506. Striping module 506 may provide RAID stripe information for the data in one or more RAID groups. For example, striping module 506 may include the logical block addresses for each RAID stripe in a RAID group for rebuild. In some embodiments, striping module 506 may include the RAID stripe information for each stripe on each storage device in the set of storage devices that makeup the RAID group. RAID stripe information may include logical address and/or logical mapping information for each storage device and/or key information or algorithms for accessing or calculating the physical locations of each RAID stripe across the storage devices. For example, a RAID stripe distributed across three storage devices may include a first segment on a first drive, a second segment on a second drive, and corresponding parity data on a third drive and the RAID stripe information in striping module 506 will enable RAID controller 502 to access the segments and parity information on any remaining drives to attempt to rebuild the RAID stripe after a failure of one of the three drives.

RAID controller 502 may include device rebuild module 508. In some embodiments, device rebuild module 508 enables RAID controller 502 to rebuild one or more storage devices after a storage device failure. For example, upon failure of a storage device in a RAID group, RAID controller 502 may initiate device rebuild module 508 to rebuild the data from the failed drive on a replacement storage device placed in the same bay the failed storage device is removed from or a hot spare maintained in a different bay. In some embodiments, device rebuild module 508 may be able to rebuild a failed storage device to a replacement storage device with a different type, capacity, interface, or location of storage and/or across multiple replacement storage devices, including storage devices or portions of storage devices present in the storage array when the first storage device failed. Device rebuild module 508 may use RAID configuration 504 and/or striping module 506 to identify and locate RAID stripes and the logical blocks within those RAID stripes for use in the rebuild process.

In some embodiments, device rebuild module 508 may include a rebuild queue 508.1. Rebuild queue 508.1 may identify the rebuild order of the RAID stripes to be rebuilt. For example, rebuild queue 508.1 may access and/or organize the RAID stripes identified in striping module 506 and with stripe units allocated to the failed storage device. These RAID stripes may be placed into a sequential queue for attempted rebuild. In some embodiments, RAID stripes may be placed into rebuild queue 508.1 based on the order in which they were written to the devices, such as last-in-first-out (LIFO) or first-in-first-out (FIFO) order. In some embodiments, placement of RAID stripes in rebuild queue 508.1 may follow an algorithm for increasing rebuild efficiency based on serialization information, physical data locations and access parameters, and/or parallel processing of multiple RAID stripes at the same time.

In some embodiments, rebuild queue 508.1 may also include queuing of RAID segments and/or device logical blocks within each RAID stripe. In some embodiments, the logical block size may be equal to the RAID segment size (also known as stripe depth, stripe length, chunk size, or stride size). In other embodiments, the logical block size may be smaller than the RAID segment size, such as RAID segments implemented at the page-level. In some embodiments, rebuild queue 508.1 may include a list of logical block addresses (LBAs) to be rebuilt using the RAID stripes.

In some embodiments, device rebuild module 508 may include a logical block progress monitor 508.2 and a stripe progress monitor 508.3. Logical block progress monitor 508.2 may track completion of each logical block successfully recovered and rebuilt to the replacement storage device. Stripe progress monitor 508.3 may track completion of each RAID stripe successfully recovered and rebuilt to the replacement storage device. Logical block progress monitor 508.2 may track rebuild of logical units at a granularity appropriate to the storage device and RAID configuration, such as matched to the native logical block size of the storage device. For example, logical block progress monitor 508.2 may track each LBA that is rebuilt.

Device rebuild module 508 may include a logical group progress monitor 508.4. In some embodiments, a logical group may include any logical data group managed at the file or data object level or higher. For example, each logical data group may correspond to a file or data object represented by a related collection of one or more logical blocks and not necessarily bounded by the RAID configuration or coextensive with a single RAID stripe. In some embodiments, logical data groups may be reserved for logical groups of files or data objects (and their underlying logical blocks), such as namespaces, volumes, or buckets (or similar object containers). In some embodiments, logical data groups may include only abstract logical data groups for application data management that are managed in an application data layer independent of physical storage parameters (e.g. device file systems, LBAs, RAID configuration, etc.), such as data objects, data object containers, and/or global namespaces.

Logical group progress monitor 508.4 may track the progress of one or more logical data groups stored in a RAID group where a storage device has failed and is in the rebuild process. For example, a RAID group may host four different logical data groups, where each logical data group is stored in multiple RAID stripes. Logical group progress monitory 508.4 may track the rebuild progress of each of the logical data groups and store an indicator of whether the rebuild of RAID stripes containing data in the logical data groups has completed. In some embodiments, logical progress monitor 508.4 may use logical block progress monitor 508.2 and/or stripe progress monitor 508.3 to identify what data elements have been rebuilt. For example, logical group progress monitor 508.4 may use logical block progress monitor 508.2 to identify logical data blocks that have been identified as rebuilt. In another example, logical group progress monitory 508.4 may use stripe progress monitor 508.3 and stripe to logical block information in striping module 506 to identify logical blocks that have been rebuilt.

In some embodiments, logical group progress monitor 508.4 may use a logical group index 510 to identify the logical blocks corresponding to each logical data group. For example, logical group index 510 may include logical mapping information for each logical date group stored in the RAID group and logical group progress monitor 508.4 may use the logical mapping information to identify the logical blocks corresponding to the logical data group. Logical group progress monitor 508.4 may compare the logical blocks identified for a group in logical group index 510 to logical blocks that have been rebuilt (as indicated by logical block progress monitor 508.2 or stripe progress monitor 508.3).

In some embodiments, a set of logical data blocks (or other data units) corresponding to each logical data group being monitored may be used to define the set of logical data blocks that must be rebuilt to achieve a rebuild complete status for each logical data group. In some embodiments, logical group progress monitor 508.4 may track and determine completion levels short of rebuild complete status as well. For example, logical group progress monitor 508.4 may identify the total number of blocks in the set of logical data blocks for the logical data group and the number of blocks from the set that have been rebuilt at any given time during the rebuild process. Thus, a number of blocks rebuilt and/or percentage of blocks rebuilt may be tracked.

Device rebuild module 508 may include a rebuild status indicator 508.5. For example, rebuild status indicator 508.5 may include a number of status settings, such as "rebuild not started", "rebuild in progress", "rebuild complete", and "rebuild failed". In some embodiments, rebuild status indicator 508.5 may be a flag, numeric code, string, or other indicator corresponding to the available status settings. Rebuild status indicator 508.5 may be updated by device rebuild module 508 throughout the rebuild process or may only be updated when the process either completes or fails. Rebuild status 508.5 may indicate the rebuild status for the entire contents of the failed storage device. In some embodiments, logical group progress monitor 508.4 may include rebuild status indicators for each logical data group being monitored and may operate independent of rebuild status 508.5.

In some embodiments, device rebuild module 508 may include or be compatible with a user interface, such as a graphical user interface, that provides visual representations of rebuild queue 508.1, logical block progress monitor 508.2, stripe progress monitor 508.3, logical group progress monitor 508.4, and/or rebuild status 508.5. For example, device rebuild module may support a graphical user interface showing rebuild queue 508.1 and progress through rebuild queue 508.1 in terms of logical data blocks, RAID stripes, and/or logical data groups. In some embodiments, a visual or audio alert may be provided when rebuilds of logical blocks (e.g. LBAs), RAID stripes, logical data groups, and/or the full data set from the failed storage device are complete or fail.

Logical group index 510 may be provided to support mapping of rebuild progress and status information from the logical block and RAID stripe information used for the rebuild to the logical data groups. For example, logical group index 510 may include entries, such as fields, tables, lists, or other data structures, for each logical data group with data units stored in the RAID group. In the embodiment shown, logical groups 1-n are represented in logical group entries 512, 514, 516 in logical group index 510. While three logical group entries are shown for logical groups designated A, B, and n, entries for any number of logical groups may be included in logical group index 510. Each of logical group entries 512, 514, 516 may include information describing the scope, such as a range of LBAs and/or descriptive metadata, of the corresponding logical data group.

In some embodiments, each of logical group entries 512, 514, 516 may include respective logical group maps 512.1, 514.1, 516.1. For example, each of logical group maps 512.1, 514.1, 516.1 may include logical mapping information from an abstract logical data group to a list of LBAs where the corresponding data elements of the logical data group are stored. In some embodiments, logical group maps 512.1, 514.1, 516.1 may include lists of LBAs or other indicators that may be mapped to LBAs for identifying the physical storage locations of the data elements for the logical data group.

In some embodiments, each of logical group entries 512, 514, 516 may include respective logical group priority indicators 512.2, 514.2, 516.2. For example, each of logical group priority indicators 512.2, 514.2, 516.2 may include one or more fields designating a relative importance or application relationship for the logical data group. In some embodiments, priority may be represented by a numerical relationship among logical groups, such that the first logical group in logical group entry 512 may have a first priority and second logical group in logical group entry 514 may have second priority, where first priority represents "mission critical" and second priority represents "active application". Other priority designations may include "failover data source" or "archival data source". In some embodiments, logical group priority may be defined by a service level agreement related to one or more of the logical groups. In some embodiments, logical group priority may designate one or more applications supported by the logical group and a user designation of application priority may determine logical group priority indicators 512.2, 514.2, 516.2.

In some embodiments, each of logical group entries 512, 514, 516 may include respective logical group status indicators 512.3, 514.3, 516.3. For example, each of logical group status indicators 512.3, 514.3, 516.3 may include one or more fields designating the status of the logical data group relative to a user application's ability to access, use, and store data to the logical data group. In some embodiments, logical group status indicators 512.3, 514.3, 516.3 may include "online" or a similar designation for production use of the logical data group and "offline" or a similar designation for logical data groups that are not presently available for production use from the data array. For example, one a storage device in the data array fails, the production status for all logical data groups in the array may be set to "offline". In some embodiments, as each logical data group is rebuilt and its logical group progress indicator 508.4 indicates rebuild complete, each logical data group's logical group status indicators 512.3, 514.3, 516.3 may be changed to "online" and related applications may resume using the logical data group for data read/write operations. In some embodiments, additional settings for logical group status indicators 512.3, 514.3, 516.3 may be available to indicate logical groups in data arrays in failure, rebuild, migration, permanent failure, and other states.

In some embodiments, a storage access controller 520 may be associated or in communication with RAID controller 502. For example, storage access controller 520 may be responsible for an alert related to the failed storage device and, in response, takes the storage array offline and initiates RAID controller 502 for rebuild. In another example, RAID controller 502 may identify a failed storage device and communicate with storage access controller 520 to take the storage array offline while RAID controller 502 attempts the rebuild process. In some embodiments, storage access controller 520 may include a storage controller associated with the read/write and/or control channels for the storage devices in the storage array that RAID controller 502 manages one or more RAID functions for, such as storage device rebuild.

Storage access controller 520 may include a storage array status indicator 522. Similar to the status options described above with regard to logical data groups in the logical data group index, storage access controller 520 may include simple status indicators, such as "offline" and "online", or more complex status indicators related to various stages of production data use, storage failure, and rebuild, recovery, or other data management. In some embodiments, storage array status indicators 522 may designate status indications for an entire storage array, a RAID group, and/or individual devices within an array and RAID group. Storage array status indicator 522 may be provided to other applications and/or application users, including data administrators, to assist in managing and maintaining the storage array and related applications.

In some embodiments, storage array status indicator 522 may include a devices-at-risk indicator 522.1. For example, storage array status indicator 522 may include a table of the storage devices in the array and for each device provide a storage device health status, such as normal, at risk, or failed. In some embodiments, RAID controller 502 may fail to complete a full rebuild of a failed drive but identify one or more logical data groups as capable of production use from the failed drive based on a partial rebuild (indicated by logical group progress indicator 508.4). In that case, storage access controller 520 may place the logical data groups back into production. In some embodiments, storage array status indicator 522 for the failed drive and/or the entire storage array may be indicated as "at risk".

Storage access controller 520 may also include a storage array definition 524. Storage array definition 524 may define various aspects of the storage array that are relevant to data management and use at the storage node, storage system, application, and/or enterprise level. For example, storage access controller 520 may maintain one or more data structures for describing the storage capacity 524.1, number of storage devices 524.2, quality of service 524.3, and/or logical groups 524.4 supported by the storage array. In some embodiments, logical groups 524.4 may include logical group index 510. These storage array parameters 524.1, 524.2, 524.3, 524.4 may represent the specifications of the available storage for use by one or more applications.

In some embodiments, after a partial rebuild by RAID controller 502, a storage array may be put back into production use for application read/write operations, but with a changed storage array definition to represent the reduced capabilities of the storage array. For example, if a partial rebuild results in ⅔ of a failed storage device being rebuilt, with only three out of the four original logical data groups rebuilt: capacity 524.1 may be reduced by ⅓ (e.g. from 36 TB to 24 TB), the number of drives may stay the same, the quality of service may stay the same, and the logical groups may be reduced from 3 to 4.

Figures 6A, 6B:
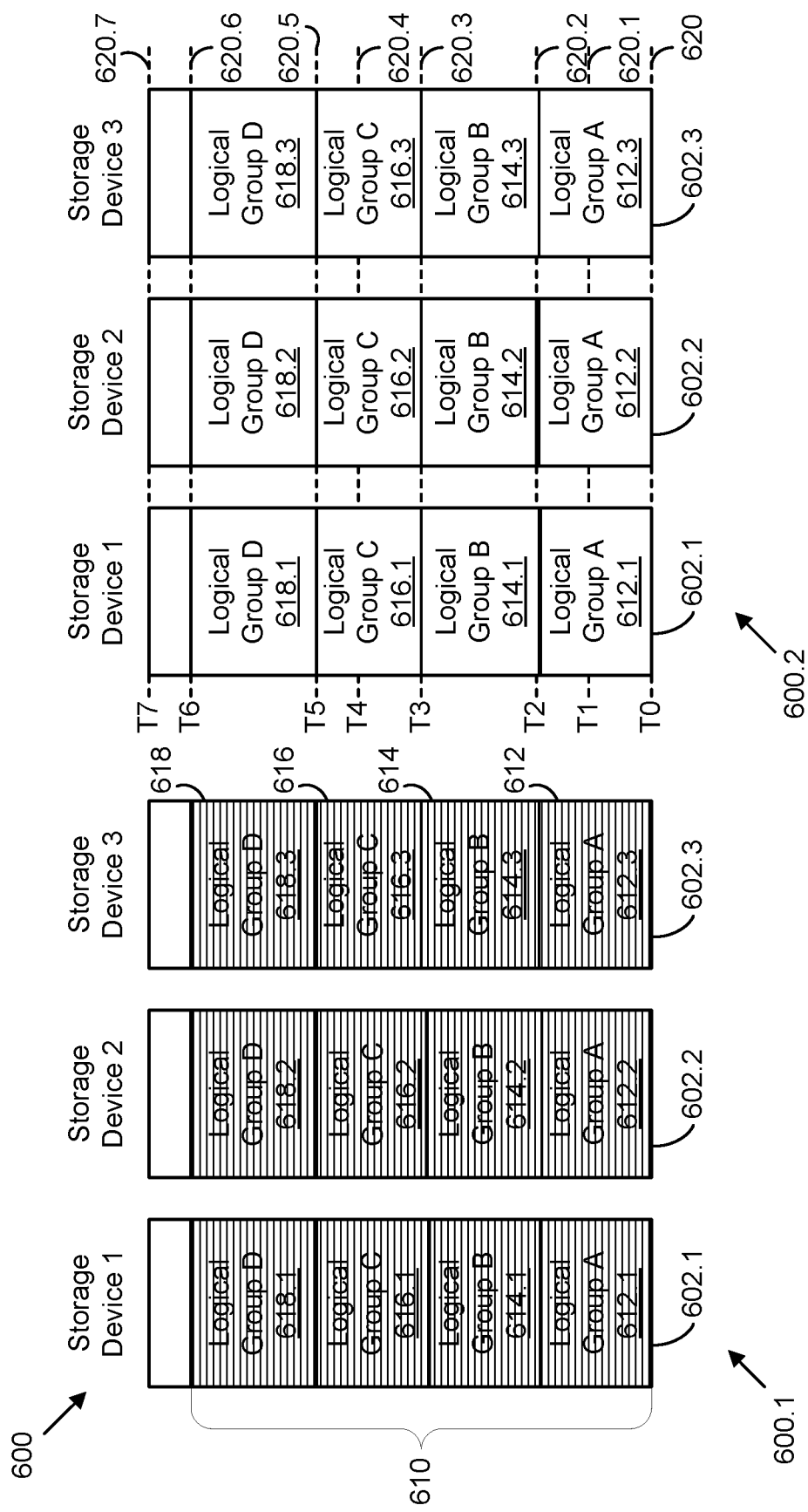
FIGS. 6a and 6b schematically illustrate an example RAID storage array before rebuild and various timepoints during rebuild in a storage system with logical data groups.

FIGS. 6a and 6b show an example storage array 600 arranged in a RAID group. In FIG. 6a storage array 600 is shown in pre-failure operation 600.1 with storage devices 602.1, 602.2, 602.3 operating in a production mode, such as for host read/write operations. In some embodiments, storage array 600 includes four logical data groups 612, 614, 616, 618 written across storage devices 602.1, 602.2, 602.3. For example, logical data groups 612, 614, 616, 618 may be stored in a plurality of RAID stripes 610 with a RAID stripe segment in each of storage devices 602.1, 602.2, 602.3. In some embodiments, the RAID configuration of storage array 600 may include parity data such that some RAID stripe segments are host data and some RAID stripe segments are parity data.

In the example shown, a first logical data group 612 occupies data storage location 612.1 on 602.1, 612.2 on 602.2, and 612.3 on 602.3 and is further divided across RAID stripes 610. A second logical data group 614 occupies data storage location 614.1 on 602.1, 614.2 on 602.2, and 614.3 on 602.3 and is further divided across RAID stripes 610. A third logical data group 616 occupies data storage location 616.1 on 602.1, 616.2 on 602.2, and 616.3 on 602.3 and is further divided across RAID stripes 610. A fourth logical data group 618 occupies data storage location 618.1 on 602.1, 618.2 on 602.2, and 618.3 on 602.3 and is further divided across RAID stripes 610. The same logical data groups 612, 614, 616, 618 are shown in FIGS. 6*a* and 6*b* on storage devices 602.1, 602.2, 602.3.

The four logical data groups 612, 614, 616, 618 are shown with their storage locations and related RAID stripes 610 clustered into continuous or sequential blocks. In some implementations, data elements and/or RAID stripes for each of logical data groups 612, 614, 616, 618 may be mixed and distributed among storage locations on the storage media in storage devices 602 without regard to which logical data group 612, 614, 616, 618 they belong. For example, a series of RAID stripes on the media may include stripes from different logical groups, such as A, B, B, C, A, D, A, A, B, C, C, B, C, D, D, D.

In an example failure event, one of storage devices 602.1, 602.2, 602.3 fails. In some embodiments, failure is indicated by failure to successfully read, write, and/or recover host data to or from one of storage devices 602.1, 602.2, 602.3. Failure may be detected by one or more systems or controllers in a storage system or may be identified by one or more system users. In some embodiments, failure may include complete failure of a storage device, where no read recovery is possible within the storage system. Failure may also include partial failure where one or more media components or other features of a storage device cease to operate normally and partial read of some stored data may be possible. Various procedures for attempted recovery and partial recovery may be used. Failure to recover some or all of the data on a storage device may trigger a rebuild process to a replacement storage device.

In FIG. 6*b*, storage array 600 is shown during a rebuild process 600.2. RAID stripes 610 are not shown in FIG. 6*b* but may still be present and used for rebuild process 600.2. Note that one of storage devices 602.1, 602.2, 602.3 has failed and the failed storage device has been replaced with a replacement storage device for the rebuild. For example, storage device 602.1 may have failed and the original storage device has been removed and replaced with a replacement storage device to receive the rebuilt data based on the remaining data in storage devices 602.2 and 602.3. While rebuild process 600.2 may proceed in any order according to the rebuild queue of a RAID controller, in the example shown, rebuild may proceed from the bottom of storage devices at time-0 620 and, in some instances, proceed to time-7 620.7 at the process end.

At time-1 620.1, rebuild process 600.2 may have proceeded through successful rebuild of a plurality of RAID stripes. If rebuild process 600.2 fails at time-1 620.1, then no logical data groups 612, 614, 616, 618 may have been successfully rebuilt and rebuild status for the failed storage device, storage array 600, and each of logical data groups 612, 614, 616, 618 may be returned as rebuild failed.

At time-2 620.2, rebuild process 600.2 may have proceeded through successful rebuild of additional RAID stripes after time-1 620.1. If rebuild process 600.2 fails at time-2 620.2, then logical data group 612 may have been successfully rebuilt and rebuild status for logical data group 612 may be returned as rebuild complete. Logical data groups 614, 616, 618 may not have been successfully rebuilt and rebuild status for the failed storage device, storage array 600, and each of logical data groups 614, 616, 618 may be returned as rebuild failed. In some embodiments, logical data group 612 may be put back into production and/or a partial rebuild status may be returned for the failed storage device and/or storage array 600.

At time-3 620.3, rebuild process 600.2 may have proceeded through successful rebuild of additional RAID stripes after time-2 620.2. If rebuild process 600.2 fails at time-3 620.3, then logical data groups 612, 614 may have been successfully rebuilt and rebuild status for logical data groups 612, 614 may be returned as rebuild complete. Logical data groups 616, 618 may not have been successfully rebuilt and rebuild status for the failed storage device, storage array 600, and each of logical data groups 616, 618 may be returned as rebuild failed. In some embodiments, logical data groups 612, 614 may be put back into production and/or a partial rebuild status may be returned for the failed storage device and/or storage array 600.

At time-4 620.4, rebuild process 600.2 may have proceeded through successful rebuild of additional RAID stripes after time-3 620.3. If rebuild process 600.2 fails at time-4 620.4, then no additional logical data groups may have completed compared to time-3 620.3 and the returned results may be the same as time-3 620.3.

At time-5 620.5, rebuild process 600.2 may have proceeded through successful rebuild of additional RAID stripes after time-4 620.4. If rebuild process 600.2 fails at time-5 620.5, then logical data groups 612, 614, 616 may have been successfully rebuilt and rebuild status for logical data groups 612, 614, 616 may be returned as rebuild complete. Logical data group 618 may not have been successfully rebuilt and rebuild status for the failed storage device, storage array 600, and logical data group 618 may be returned as rebuild failed. In some embodiments, logical data groups 612, 614, 616 may be put back into production and/or a partial rebuild status may be returned for the failed storage device and/or storage array 600.

At time-6 620.6, rebuild process 600.2 may have proceeded through successful rebuild of additional RAID stripes after time-5 620.5. If rebuild process 600.2 fails at time-6 620.6, then logical data groups 612, 614, 616, 618 may have been successfully rebuilt and rebuild status for logical data groups 612, 614, 616, 618 may be returned as rebuild complete. In some embodiments, not all data in storage array 600 may belong to one or more of logical data groups 612, 614, 616, 618 and rebuild process 600.2 completing rebuild of logical data groups 612, 614, 616, 618 may not indicate a complete rebuild of the failed storage device or storage array 600. Rebuild status for the failed storage device and/or storage array 600 may be returned as rebuild failed. In some embodiments, logical data groups 612, 614, 616, 618 may be put back into production and/or a partial rebuild status may be returned for the failed storage device and/or storage array 600.

At time 7 620.7, rebuild process 600.2 is complete and all RAID stripes and any other data to be recovered may have been recovered. If no rebuild failure has occurred, all logical data groups 612, 614, 616, 618, the replacement storage device, and storage array 600 may all be returned to production with a rebuild complete status.

In some embodiments, rebuild may be suspended (without a rebuild failure event) after the successful rebuild of one or more of logical data groups 612, 614, 616, 618 and the successfully rebuilt logical data groups may be placed into production. For example, after time-3 620.3, rebuild process 600.2 may be suspended based on the priority of logical data groups 612, 614 and they may be put into production. Rebuild process 600.2 may be continued at a future time based on reduced application usage, maintenance schedule, or other factors that allow the high priority logical data groups 612, 614 to be taken back out of production for process 600.2 to complete.

Figure 7:
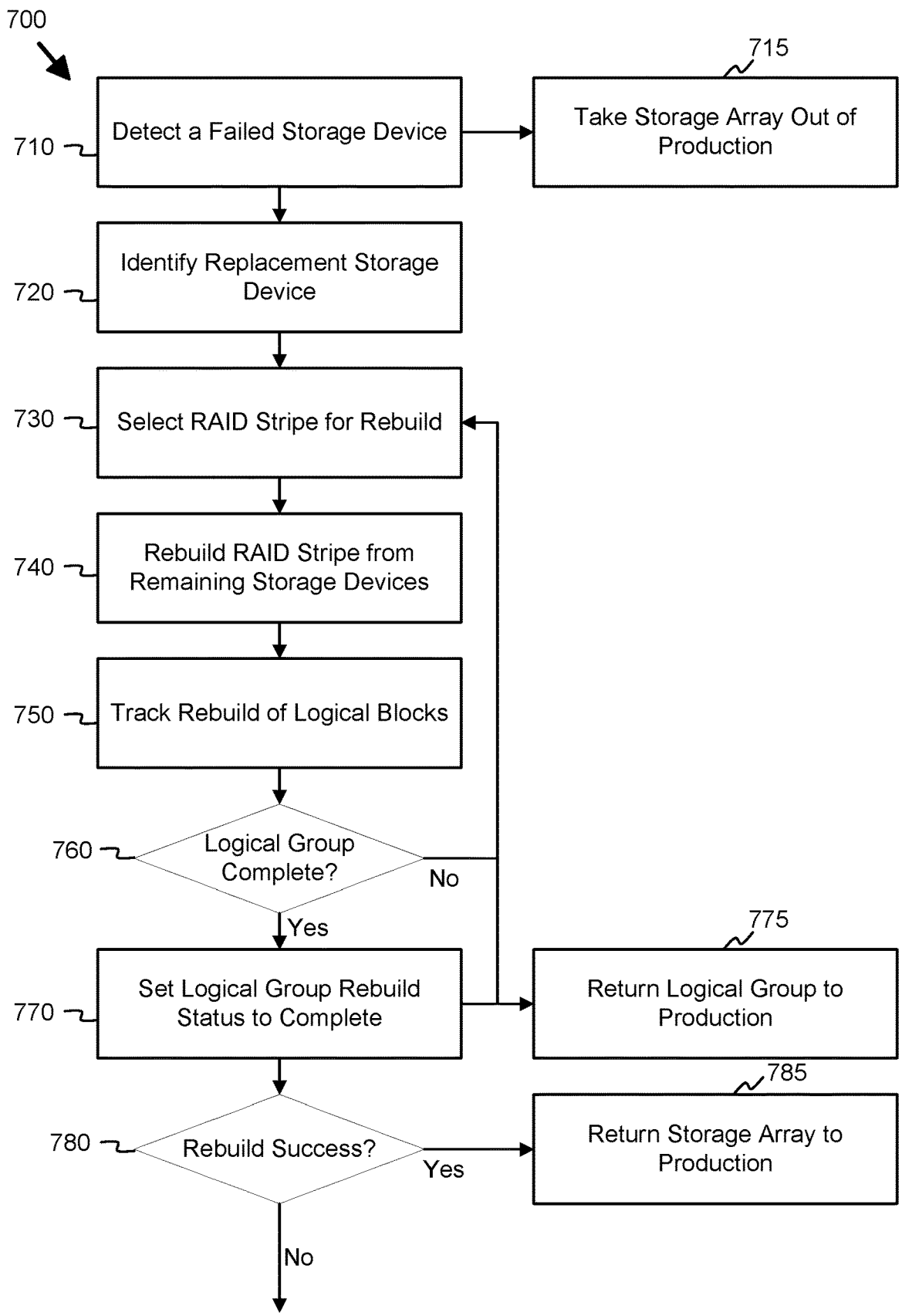
FIG. 7 illustrates an example embodiment of a method for RAID rebuild of a failed storage device using a storage system with logical data groups.

As shown in FIG. 7, the storage system 1 may be operated according to a rebuild method for data storage arrays containing logical data groups, i.e. according to the method 700 illustrated by the blocks 710-785 of FIG. 7.

At block 710, a failed storage device is detected in the storage array. For example, a storage device in a RAID group in the storage array may be diagnosed with a complete or partial failure. In some embodiments, the failed storage device may be detected by a storage controller, RAID controller, storage node component, and/or administrative user and a RAID rebuild process may be initiated. In some embodiments, the storage array may be taken out of production at block 715 while the rebuild process is started.

At block 720, a replacement storage device is identified for use in the rebuild process. For example, the failed storage device may be removed from a bay in the storage array and a new storage device may be placed in the bay to be the replacement storage device. In another example, the storage array may include one or more hot spares that may be selected for use as the replacement storage device and/or available capacity on one or more existing storage devices may be allocated to receiving the rebuilt data elements from the failed storage device. In some embodiments, a portion of the data on the failed storage device may have still been accessible and moved to the replacement storage device or otherwise made available for the rebuild process.

At block 730, a RAID stripe is selected for rebuild. For example, a rebuild queue may define an order in which the RAID stripes in the failed storage device are to be rebuilt and the next RAID stripe in the queue may be selected.

At block 740, the selected RAID stripe is rebuilt. For example, one or more RAID segments from remaining storage devices are selected and used to rebuild the corresponding RAID segment from the RAID stripe from the failed storage device. In some embodiments, the RAID segment from the failed storage device is generated, at least in part, from a host data segment on one remaining storage device and a parity data segment on another remaining storage device. The rebuilt RAID segment from the failed storage device is written to the replacement storage device.

At block 750, the logical blocks are tracked as they are rebuilt. For example, as a RAID stripe is rebuilt, the corresponding host LBAs may be identified. In some embodiments, a RAID stripe is completed and the corresponding LBAs are identified from RAID striping data. In some embodiments, LBAs are identified and logged as they are written to the replacement storage device.

At block 760, the completion status of at least one logical group may be evaluated. For example, the rebuilt LBAs may be compared against one or more lists of LBAs corresponding to one or more logical data groups. If no new logical data groups have been completed, then method 700 may return to block 730 to select the next RAID stripe for rebuild. If a new logical data group has been completed, then method 700 may continue to block 770.

At block 770, the logical group rebuild status for the logical data group that has been completed is set to rebuild complete. For example, rebuild status of the logical data groups in the data array being rebuilt may be maintained in a table, such as a logical group index, or another data structure. When all LBAs in the logical data group have been rebuilt, the logical group rebuild status indicator for the logical data group may be changed from a rebuilding value to a rebuild complete value.

In some embodiments, the logical data group with a rebuild status of complete may be returned to production at block 775. For example, each logical data group may be returned to production as it is completed based on a priority setting. In some embodiments, each logical data group may have a priority indicator that indicates that the logical data group should be returned to production immediately following rebuild of all of its LBAs and not wait for complete rebuild (or rebuild failure) of the RAID group.

When all LBAs that can be recovered by the rebuild process have been recovered, method 700 may continue to block 780. At block 780, the success of the failed storage device rebuild may be evaluated. For example, a list of all RAID stripes and/or LBAs stored on the failed storage device may be compared to a log of the RAID stripes and/or LBAs rebuilt to determine whether the rebuild is complete. In another embodiment, the rebuild process moves through all RAID stripes to be rebuilt and logs process steps, RAID stripe rebuilds, and/or LBA rebuilds that fail to complete. If any failures cannot be corrected through retry or other rebuild processes, the rebuild status is returned as a rebuild failure. In some embodiments, if the rebuild is a success, the storage array is returned to production at block 785. If the rebuild is a failure, the logical data groups that were successfully rebuilt only may be returned to production and/or further processing may be conducted in accordance with method 800 in FIG. 8.

Figure 8:
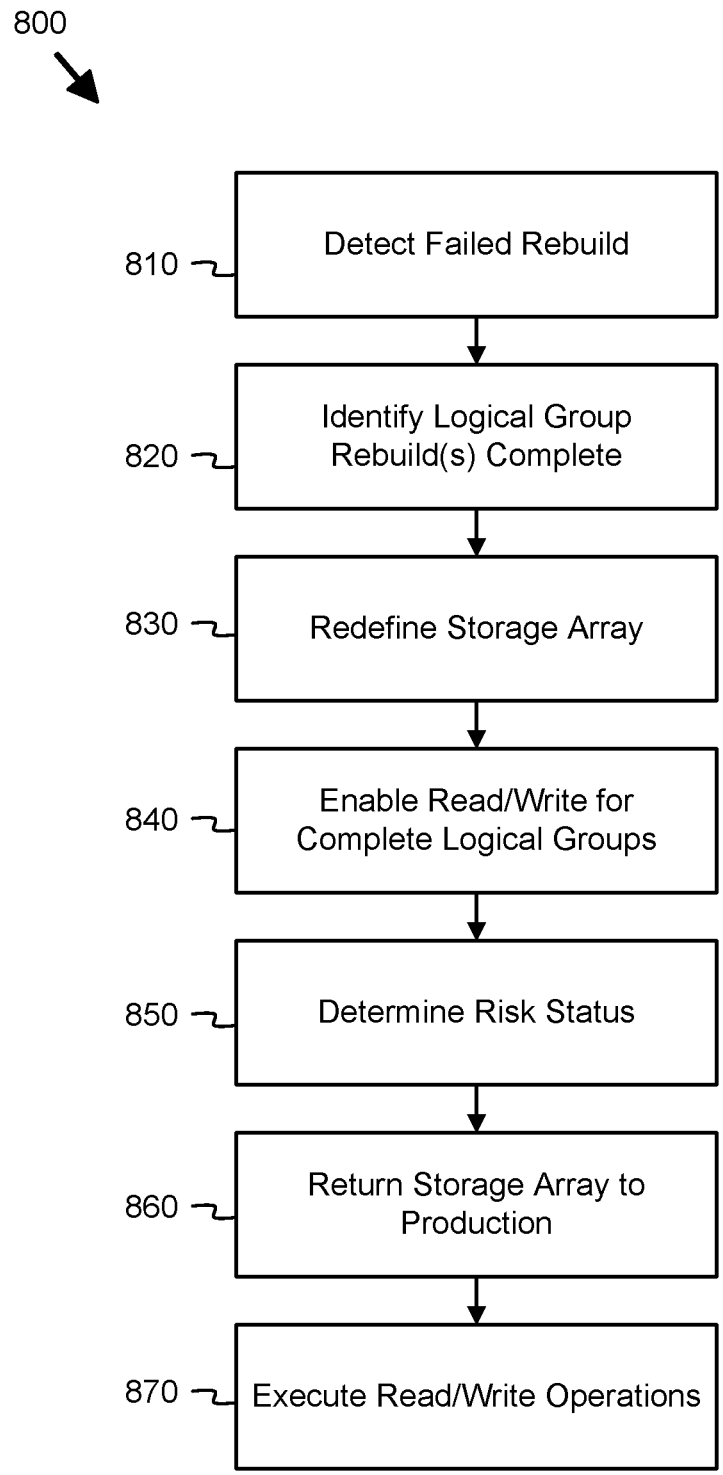
FIG. 8 further illustrates the example method of FIG. 7 with regard to a failed device rebuild.

As shown in FIG. 8, the storage system 1 may be operated according to a method for putting data storage arrays back into production without fully completing a rebuild of a failed storage device, i.e. according to the method 800 illustrated by the blocks 810-870 of FIG. 8. In some embodiments, method 800 may selectively follow method 700 of FIG. 7. In some embodiments, method 800 may be selectively initiated before a full rebuild process has completed to enable use of one or more logical data groups prior to the full rebuild process completing. For example, the rebuild process may be suspended or proceed in parallel with method 800 and the resulting production operation for host read/write processing.

At block 810, a failed or suspended rebuild is detected in the storage array. For example, a rebuild may fail to complete as described above with regard to block 780 in FIG. 7. In some embodiments, block 810 may be initiated by a partial rebuild where the rebuild process is ongoing or by a partial rebuild where the rebuild process has been suspended until some future time or other event. The failed rebuild may indicate that the entire data set from the failed storage device and/or storage capacity of the failed storage device is not available for use on the replacement storage device.

At block 820, one or more logical data groups may be identified as having been completely rebuilt. For example, in a RAID group containing four logical data groups, a first logical data group may be identified as completely rebuilt with all LBAs in the first logical data group recovered and available on the replacement storage device. The additional three logical data groups may be incomplete, with one or more LBAs not yet rebuilt (or having failed to rebuild). The first logical data group may be identified as complete and used for the remainder of method 800. In some embodiments, more than one logical data group may be complete and the used for the remainder of method 800.

At block 830, the storage array may be redefined based on the one or more logical data groups that have been rebuild. For example, the first logical data group may serve a particular user or application and have a defined capacity, service level, and/or other parameters. The storage array may be represented by a storage array definition used by storage system 1 and/or one or more applications, users, and/or data management systems to support host data applications. In some embodiments, the storage array definition may be updated to reflect the limited parameters of only the rebuilt logical data groups. For example, the capacity, quality of service, and logical data groups (and/or corresponding data resources, related applications, users, etc.) may be redefined to correspond only to the parameters of the rebuild logical data groups. In some embodiments, the total capacity of the storage array may be redefined to be at least the sum of the allocated storage capacity of each of the logical data groups that have been completely rebuilt, which is less than the total original capacity of the storage array (and/or the RAID group) before the failed storage device failed.

At block 840, read/write operations for the completed logical data groups is enabled. For example, in a storage system where a storage controller processes host read/write commands and determines whether the requested LBAs or other storage resources are available, the storage controller may identify the completed logical data groups as available for host read/write operations. Production status for host read/write operations may be determined and/or stored in a variety of locations depending on the configuration of the storage system and/or storage nodes and the level at which host read/write commands are processed for data access and availability. Portions of the data array not returned to production, such as logical data groups that did not complete the rebuild process, may return an error or other status message in response to host read/write commands.

At block 850, a risk status may be determined and/or set for the data array and/or various components thereof. For example, a failed or incomplete rebuild may represent both a risk with regard to the unrecovered data and the likelihood that that additional failure may occur (e.g. during a continued rebuild process, failure of an additional storage device, or less reliable operation of the replacement storage device) which could jeopardize even the recovered data. In some embodiments, one or more storage controllers or data management systems may maintain risk assessments of one or more storage elements, including storage arrays, storage nodes, RAID groups, storage devices, and other elements. By indicating that a failure and partial rebuild has occurred and setting an appropriate risk parameter, data management decisions may be made for migrating, replicating, and/or otherwise attempting to mitigate the increased likelihood of failure and resulting data risk.

At block 860, the storage array may be returned to production with its reduced capabilities. For example, the redefined storage array parameters and reduced logical data groups enabled for read/write operations may be made available to storage system 1 and/or other systems in communication with storage system 1.

At block 870, production read/write operations may be executed against the logical data groups that have been rebuilt. For example, the LBAs corresponding to those data groups may be successfully used for processing host read/write operations and the corresponding logical data groups (and related applications) may be provided with production read/write access. In some embodiments, the return to production read/write operations may be accompanied with some level of added data protection commensurate with the risk status identified in block 850.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A storage system, comprising:
a plurality of storage devices configured as a storage array for storing, as logical blocks, a plurality of logical data groups distributed among the plurality of storage devices;
a redundant array of independent disks (RAID) controller configured to write, without reference to the plurality of logical data groups, the logical blocks of the plurality of logical data groups in a configuration of RAID stripes across at least one RAID group in the plurality of storage devices, the RAID controller comprising:
a striping module configured to store logical mapping information for the logical blocks in the RAID stripes, wherein:
each RAID stripe of the configuration of RAID stripes includes a plurality of data segments and corresponding parity data distributed across a RAID group of storage devices, and the logical mapping information identifies the logical blocks in the plurality of data segments of each RAID stripe;
a rebuild module configured to rebuild a failed storage device from the plurality of storage devices based on the configuration of RAID stripes; and
a rebuild progress monitor configured to track completed rebuilds of logical blocks from the failed storage device during a device rebuild process, wherein the rebuild progress monitor identifies logical block addresses of rebuilt logical blocks;
a logical group index comprising a logical group map for each logical data group of the plurality of logical data groups, wherein the logical group map for each logical data group of the plurality of logical data groups identifies logical block addresses of the logical blocks corresponding to that each logical data group of the plurality of logical data groups; and
a logical group rebuild module configured to:
determine a logical group rebuild status by comparing the logical block addresses of the completed rebuilds of logical blocks from the rebuild progress monitor to the logical block addresses of at least one logical group map in the logical group index, wherein:
a first RAID stripe includes at least one logical block for a first logical data group of the plurality of logical data groups;
a second RAID stripe includes at least one logical block for the first logical data group of the plurality of logical data groups; and
a third RAID stripe stored between the first RAID stripe and the second RAID stripe includes at least one logical block for a second logical data group of the plurality of logical data groups; and
provide a logical group rebuild status as complete in response to at least one logical data group having been rebuilt.

2. The storage system of claim 1, wherein:
the device rebuild process fails before the failed storage device rebuild is complete;
the logical group rebuild status is complete for at least one logical data group; and
the storage system further comprises a storage access controller configured to enable the at least one logical data group with the logical group rebuild status of complete to be used for production read/write operations.

3. The storage system of claim 2, wherein the storage access controller is further configured to redefine the storage array to exclude any logical data groups that do not have the logical group rebuild status of complete in response to the device rebuild process failing.

4. The storage system of claim 3, wherein:
each logical data group of the plurality of logical data groups has an allocated storage capacity; and
redefining the storage array to exclude any logical data groups that do not have the logical group rebuild status of complete includes redefining a total capacity of the storage array to comprise:
  at least a sum of the allocated storage capacity of each logical data group of the plurality of logical data groups that have the logical group rebuild status of complete; and
  less than a total original capacity of the storage array before the failed storage device failed.

5. The storage system of claim 2, wherein the storage access controller is further configured to determine a risk status in response to a partial rebuild of the failed storage device.

6. The storage system of claim 1, wherein:
the rebuild module further comprises a rebuild queue defining a rebuild order for the logical blocks of the failed storage device; and
the rebuild order proceeds through the configuration of RAID stripes without reference to the plurality of logical data groups.

7. The storage system of claim 1, wherein:
the plurality of logical data groups includes a first logical data group and a second logical data group; and
the storage system further comprises:
a storage access controller configured to:
  enable the first logical data group to be used for production read/write operations in response to the logical group rebuild status for the first logical data group becoming complete at a first rebuild time; and
  enable the second logical data group to be used for production read/write operations in response to the logical group rebuild status for the second logical data group becoming complete at a second rebuild time that is different from the first rebuild time.

8. A computer-implemented method, comprising:
accessing a logical group index for a plurality of storage devices configured as a storage array for storing a plurality of logical data groups distributed among the plurality of storage devices, wherein:
  the logical group index comprises a logical group map for each logical data group of the plurality of logical data groups; and
  the logical group map identifies logical block addresses of logical blocks corresponding to each logical data group of the plurality of logical data groups;
writing, without reference to the plurality of logical data groups, the logical blocks corresponding to each logical data group of the plurality of logical data groups in a configuration of redundant array of independent disks (RAID) stripes across at least one RAID group in the plurality of storage devices, wherein:
  each RAID stripe of the configuration of RAID stripes includes a plurality of data segments and corresponding parity data distributed across a RAID group of storage devices;
  the plurality of data segments of each RAID stripe includes at least one logical block;
  a first RAID stripe includes at least one logical block for a first logical data group of the plurality of logical data groups;
  a second RAID stripe includes at least one logical block for the first logical data group of the plurality of logical data groups; and
  a third RAID stripe stored between the first RAID stripe and the second RAID stripe includes at least one logical block for a second logical data group of the plurality of logical data groups; and
in response to a failed storage device failing among the plurality of storage devices:
  identifying a replacement storage device for rebuilding the failed storage device;
  rebuilding the failed storage device to the replacement storage device based on the configuration of RAID stripes;
  tracking, using logical block addresses, completed rebuilds of logical blocks from the failed storage device during a device rebuild process;
  comparing logical block addresses of the completed rebuilds of logical blocks to the logical block addresses in at least one logical group map in the logical group index during the device rebuild process; and
  setting a logical group rebuild status to complete for at least one logical data group in response to all logical blocks in the at least one logical data group having been rebuilt in the device rebuild process.

9. The computer-implemented method of claim 8, further comprising:
failing the device rebuild process:
  before the rebuilding of the failed storage device is complete; and
  after the logical group rebuild status is complete for at least one logical data group;
enabling the at least one logical data group with the logical group rebuild status of complete to be used for production read/write operations; and
executing read/write operations to the at least logical data group with the logical group rebuild status of complete.

10. The computer-implemented method of claim 9, further comprising:
redefining the storage array to exclude any logical data groups that do not have the logical group rebuild status of complete in response to failing the device rebuild process.

11. The computer-implemented method of claim 10, wherein:
each logical data group of the plurality of logical data groups has an allocated storage capacity; and
redefining the storage array to exclude any logical data groups that do not have the logical group rebuild status of complete includes redefining a total capacity of the storage array to be:
  at least a sum of the allocated storage capacity of each logical data group of the plurality of logical data groups that have the logical group rebuild status of complete; and
  less than a total original capacity of the storage array before the failed storage device failed.

12. The computer-implemented method of claim 9, further comprising:
determining a risk status in response to a partial rebuild of the failed storage device.

13. The computer-implemented method of claim 8, wherein the device rebuild process comprises:
   selecting a rebuild order for the logical blocks of the failed storage device:
      based on the configuration of RAID stripes; and
      without reference to the plurality of logical data groups; and
   rebuilding the logical blocks of the failed storage device in the rebuild order.

14. The computer-implemented method of claim 8, wherein:
   the plurality of logical data groups includes:
      a first logical data group; and
      a second logical data group; and
   the method further comprises:
      enabling the first logical data group to be used for production read/write operations in response to setting a first logical group rebuild status for the first logical data group to complete at a first rebuild time; and
      enabling the second logical data group to be used for production read/write operations in response to setting a second logical group rebuild status for the second logical data group becoming complete at a second rebuild time that is different from the first rebuild time.

15. A system, comprising:
   a processor;
   a memory;
   means, stored in the memory for execution by the processor, for accessing a logical group index for a plurality of storage devices configured as a storage array for storing a plurality of logical data groups distributed among the plurality of storage devices, wherein:
      the logical group index comprises a logical group map for each logical data group of the plurality of logical data groups; and
      the logical group map identifies logical block addresses of logical blocks corresponding to each logical data group of the plurality of logical data groups;
   means, stored in the memory for execution by the processor, for writing, without reference to the plurality of logical data groups, the logical blocks corresponding to each logical data group of the plurality of logical data groups in a configuration of redundant array of independent disks (RAID) stripes across at least one RAID group in the plurality of storage devices, wherein:
      each RAID stripe of the configuration of RAID stripes includes a plurality of data segments and corresponding parity data distributed across a RAID group of storage devices;
      the plurality of data segments of each RAID stripe includes at least one logical block;
      a first RAID stripe includes at least one logical block for a first logical data group of the plurality of logical data groups;
      a second RAID stripe includes at least one logical block for the first logical data group of the plurality of logical data groups; and
      a third RAID stripe stored between the first RAID stripe and the second RAID stripe includes at least one logical block for a second logical data group of the plurality of logical data groups;
   means, stored in the memory for execution by the processor, for identifying a replacement storage device for rebuilding a failed storage device;
   means, stored in the memory for execution by the processor, for rebuilding the failed storage device to the replacement storage device based on the configuration of RAID stripes;
   means, stored in the memory for execution by the processor, for tracking, using logical block addresses, completed rebuilds of logical blocks from the failed storage device during a device rebuild process;
   means, stored in the memory for execution by the processor, for comparing logical block addresses of the completed rebuilds of logical blocks to the logical block addresses in at least one logical group map in the logical group index during the device rebuild process; and
   means, stored in the memory for execution by the processor, for setting a logical group rebuild status to complete for at least one logical data group in response to all logical blocks in the at least one logical data group having been rebuilt in the device rebuild process.

16. The system of claim 15, further comprising:
   means, stored in the memory for execution by the processor, for enabling the at least one logical data group with the logical group rebuild status of complete to be used for production read/write operations; and
   means, stored in the memory for execution by the processor, for executing read/write operations to the at least logical data group with the logical group rebuild status of complete, wherein the device rebuild process failed before the rebuilding of the failed storage device is complete and after the logical group rebuild status is complete for at least one logical data group.

17. The system of claim 16, further comprising:
   means, stored in the memory for execution by the processor, for redefining the storage array to exclude any logical data groups that do not have the logical group rebuild status of complete in response to failing the device rebuild process.

18. The system of claim 15, further comprising:
   means, stored in the memory for execution by the processor, for selecting a rebuild order for the logical blocks of the failed storage device:
   based on the configuration of RAID stripes; and
   without reference to the plurality of logical data groups, wherein the means for rebuilding the logical blocks of the failed storage device uses the rebuild order.

19. The system of claim 15, wherein:
   the plurality of logical data groups includes:
      a first logical data group; and
      a second logical data group; and
   the system further comprises:
      means, stored in the memory for execution by the processor, for enabling the first logical data group to be used for production read/write operations in response to setting a first logical group rebuild status for the first logical data group to complete at a first rebuild time; and
      means, stored in the memory for execution by the processor, for enabling the second logical data group to be used for production read/write operations in response to setting a second logical group rebuild status for the second logical data group becoming complete at a second rebuild time that is different from the first rebuild time.

20. The storage system of claim 1, wherein the logical blocks for at least one logical data group of the plurality of logical data groups includes logical blocks in a plurality of RAID stripes in the configuration of RAID stripes.

* * * * *